3,780,011
CATALYST AND CATALYTIC PROCESS

Thomas J. Pullukat, Des Plaines, and Mitsuzo Shida, Barrington, Ill., assignors to Chemplex Company, Rolling Meadows, Ill.
No Drawing. Filed Apr. 9, 1971, Ser. No. 132,907
Int. Cl. C08f 1/70, 3/06, 3/08
U.S. Cl. 260—94.9 D                               23 Claims

ABSTRACT OF THE DISCLOSURE

A catalyst containing chromium oxide supported on a difficultly reducible carrier as its major component and also including metal of the class consisting of titanium, boron, vanadium and mixtures of these in which the catalyst is particularly useful for polymerizing olefins and particularly those of from 2 to 8 carbon atoms so as to predetermine the structure, composition, physical and chemical properties and uses and applications of the resulting polymers by the components of the catalyst, with the result that the polymer desired is produced in the reactor rather than by post-treatment of the polymer or blending of two or more polymers with different properties in an attempt to achieve a blend of the desired properties. The disclosure also includes the method of polymerizing at least one olefin by a particle form or slurry process utilizing the new catalyst with the polymerization taking place in an inert diluent in which the resulting polymer is substantially insoluble at the temperature and pressure of polymerization. The new catalysts can also be used in solution form polymerization.

The catalyst includes chromium oxide plus an oxygenated metal compound of titanium, boron or vanadium or combinations of these. Examples of such catalysts are chromium oxide plus titanium, chromium oxide plus boron, chromium oxide plus vanadium, chromium oxide plus titanium and boron and chromium oxide plus titanium and vanadium. In each of these the titanium, boron and vanadium are oxygenated and preferably prepared by treating the organic compounds, and specifically esters, of these metals with oxygen.

BACKGROUND OF THE INVENTION

It is now customary to produce polymers of 1-olefins having a maximum of 8 carbon atoms and no branching nearer the double bond than the 4-position by polymerizing the olefin with a catalyst containing a chromium oxide of which at least 0.1 weight percent is hexavalent chromium at the time of initial contact with the olefin. Where the olefin is a conjugated diolefin the branching (such as the presence of a methyl group) can be closer to the double bond than the 4-position.

The chromium oxide catalyst polymerization of ethylene, for example, when conducted at low polymerizing temperature (0–400° F. for both particle form and solution form polymerization) of which about 200–290° F. is an exemplary range and low pressure (not over 1,000 p.s.i. gauge) produces nearly 100% conversion of the ethylene to high density polyethylene which is ordinarily defined as one having a density of 0.945 to 0.965. Such a polymer is crystalline, that is, relatively unbranched and it is inert to most chemicals, is rigid with good tensile strength and is usable at extremes of high and low temperatures without degradation of physical and chemical properties. Such a high density polyethylene is essentially a chain of methylene groups having a methyl group on one end and a vinyl group on the other with a molecular weight of about 5,000 to 1,000,000.

A chromium oxide catalyst is activated at an elevated temperature to prepare the catalyst for the polymerization reaction. Preferably, this activation is done under non-reducing conditions as in an atmosphere such as oxygen, air, nitrogen, carbon dioxide or an inert gas constituent of air. The atmosphere is substantially anhydrous as by having a dew point below about 0° F. Reducing gases can be present so long as the time of contact is limited to prevent substantial reduction of the hexavalent chromium content.

The temperature and time of activation can vary over wide ranges, but the activation temperature will ordinarily be from about 350–1800° F. with a practically desirable range being about 750–1650° F. for times varying, for example, from about 1 hour at the highest temperature to about 50 hours or more at the lowest temperatures. A practically desirable time range is about 1–20 hours.

The feed olefins, $C_2$ to $C_8$ 1-olefins and conjugated diolefins, for polymerization with the chromium oxide catalyst include ethylene, propylene, 1-butene, 1-pentene, 1-hexene, 4-methyl-1-pentene, 1-octane, butadiene, isoprene, piperylene, 1,3-octadiene, etc. Copolymers of two or more monomers can also be prepared.

The chromium oxide process of polymerizing 1-olefins is particularly adaptable to the particle form or slurry process in which the polymer formed is insoluble in the liquid present at the low temperatures and low pressures used. This particle form process results in polymers with higher molecular weights. The essential ingredients in such a customary particle form process are the diluent liquid which is usually a hydrocarbon, the olefin and the catalyst suspended in the liquid. The polymer that is formed also remains predominantly suspended in the liquid along with the catalyst so that it may be easily separated with the catalyst from the liquid. If desired, the polymer and catalyst may be separated from each other by well-known processes or the catalyst may be left in the polymer where the presence in such small amounts will not be harmful.

There are many materials which can be used as a support or carrier for active catalytic agents in the customary manner. The particular choice of a carrier depends upon many factors, e.g. surface area, density, porosity, particle size, specific heat, heat stability, and mechanical strength. Most carrier materials, and the naturally occurring materials in particular, are generally pretreated by washing, grinding, acid treating, calcining, or other means to remove impurities or to improve physical characteristics of the material. Carriers suitable for the catalyst of the present invention are difficultly reducible materials, for example, silica gel, natural and synthetic alumina, mixed gels comprising $SiO_2$ and $Al_2O_3$, aluminum silicate, and pumice. The preferred carriers include silica, alumina, zirconia, thoria and mixed gels of which the dry matter comprises mainly, i.e. more than 50% by weight, free and/or bound $SiO_2$ and minor amounts of $Al_2O_3$. Examples of mixed gels are the commercial silica-alumina cracking catalyst. The expression "gel" is used to designate both the fresh, water-containing gels proper and the products obtained by drying (activating) these gels.

SUMMARY OF THE INVENTION

We have invented a class of catalysts that are improvements over the commonly used catalysts described generally in the above "background." These contain titanium, boron, vanadium or mixtures in oxygenated form in addition to the customary chromium oxide.

In adding titanium, boron, vanadium or combinations the organic compounds of the metals are mixed together before addition to the chromium oxide catalyst which at that time may be on the carrier. Then the oxygen is introduced to oxygenate the compounds. The catalysts of this invention may be used for both solution form and particle form polymerization.

The new catalysts produce polyethylene having a melt index (MI, which indicates generally the molecular weight) that is higher (as determined by ASTM D-1238-52T), i.e. have a lower molecular weight, than heretofore obtained in particle form olefin, and particularly ethylene, polymerization systems, and a high and variable shear response or molecular weight distribution (MWD) as determined by the ratio of high load melt index (HLMI) to regular melt index (MI). The presence of the boron, vanadium or both results in polyolefins and particularly polyethylene of low shear response or HLMI to MI by ratio.

Thus the invention involves not only novel modified chromium oxide catalyst systems but also new methods of producing polyolefins and novel polyolefins having characteristics exactly tailored to the desired characteristics by controlling the amounts of titanium and/or boron and/or vanadium that are present with the chromium oxide. For example, by using a mixture of chromium oxide with oxygenated titanium, boron, or vanadium, or combinations, a polyethylene is produced having a high MI resulting from the presence of the titanium combined with the narrow MWD resulting from the boron or vanadium or both.

The greatest use for high density polyethylene at the present time is in blow molding processes. For a high density polyethylene to have good characteristics for blow molding it must have somewhat specific viscoelastic properties and the present particle form polymerization techniques are not flexible enough to produce high density polyethylene with the range of viscoelastic properties required particularly for blow molding the polyethylene with the common high speed reciprocating extruding processes and machines. At the present time polyethylene for blow molding is compounded by blending particle form and solution form high density polyethylenes in various proportions to achieve the desired resin properties.

Such blending of the two forms of polyethylene is not entirely satisfactory because it is difficult to achieve the exact results required. Polymers made by this invention avoid these difficulties as the catalyst of this invention can have predetermined properties by a suitable choice of constituents to produce high density polyethylene in the reactor directly usable for blow molding applications. Thus it is now possible with the catalyst of this invention to produce polyethylene resins with variable shear response in a particle form ethylene polymerization system. The catalysts of this invention can also be used for solution form polymerization.

DESCRIPTION OF THE PREFERRED EMBODIMENTS

The presence in the catalyst of the titanium with the chromium oxide results in a polyolefin, and particularly a polyethylene, of high melt index which is higher than that before obtainable in a particle form ethylene polymerization system using the customary chromium oxide catalyst. The presence of the titanium in the catalyst also results in an olefin polymer, particularly a polyethylene, of high and variable shear response or molecular weight distribution (MWD) as determined by the ratio of high load melt index (HLMI) to regular index (MI) [ASTM D-1238-62T, conditions F and E, respectively].

The usual chromium oxide containing catalyst produces a polyethylene with limited control over molecular weight which makes it unsuitable for certain uses and particularly for injection molding. The new catalysts of this invention avoid this.

In preparing the catalyst of this invention a catalyst support of the type discussed above (of which silica is an excellent example) is mixed with the desired proportion of chromium trioxide and this mixture is then dried by fluidizing at an elevated temperature in a catalyst activator using dry air or similar atmosphere also as discussed above. Then to the fluidized bed of catalyst at the drying temperature used, a titanium, for example, alkyl ester containing from 1 to 7 carbon atoms in the alkyl group is introduced. Thus an excellent ester has been found to be titanium tetraisopropionate and in specific examples was introduced in amounts of 2%, 2½%, 3½, 5% and 8% by weight of the catalyst. Examples of such esters are tetramethyl, tetrahexyl, the isomeric tetrapropyl, tetraethyl, tetrabutyl, tetraamyl and tetraheptyl.

Upon the addition of the titanium ester the orange catalyst turns grey and there is a sudden jump in temperature of as much as 60° C. indicating an exothermic reaction. This titanium treated catalyst is then activated at an even higher temperature using dry air. The final activated catalyst may then be used in 1-olefin, e.g. ethylene, polymerizations at polymerization temperatures and pressures.

The treatment of the catalyst with titanium is normally carried out at the relative high temperature of approximately 100° C.

The optimum concentration of chromium trioxide in the catalyst of this invention is about 2%. For highest MI the optimum amount of titanium is about 3.5%. By varying the titanium concentration on the catalyst, the shear sensitivity of the resulting polymer can be varied as desired. The titanated catalysts of this invention are considerably more active than the standard catalyst and the polymerization reaction proceeds with no induction time.

The melting characteristics of polyethylene produced with the titanated catalyst of this invention are different from the melting characteristics of regular particle form polyethylene. The molecular weight distribution by gel permeation chromatography (GPC) of the polyethylene produced with the titanated catalyst of this invention is similar to that of a solution form polyethylene.

By using controlled polymerization with catalysts not containing the titanium compounds it is readily evident that the titanium treated catalyst of this invention gives polyethylene resins with much higher melt indexes than the untreated catalysts as shown on the following Tables I, II and III.

In some tests a chain transfer agent such as hydrogen, hexene and the like was used and further increased the melt index and the variable shear response. Silica having a large pore volume resulted in polyethylene of a higher melt index for a given titanium content in the catalyst. The shear response of the polyethylene made by the titanium treated catalyst is higher than that obtained from a catalyst containing no titanium. Thus by varying the concentrations of the titanium in the catalyst it is possible to control the viscoelastic properties of the resulting polyethylene to achieve the desired results without requiring the customary blending of different types of polyethylene. Thus with the catalyst of this invention it is possible to "tailor-make" polyethylene for specific applications such as for high speed blow molding now commonly used in manufacturing. These results are tabulated in Table IV.

In each of Examples 1–39 of Tables I to IV the same general process was followed. To illustrate, for control Example No. 14 of Table II the following procedure was followed.

Polymerizations were carried out in a 1300 ml. capacity chromium plated carbon steel reactor. The reactor was purged with nitrogen while it was maintained at 108° C. A 0.0793 g. quantity of the catalyst was charged into the reactor and the reactor was closed. Isobutane (500 ml.) was charged into the reactor and stirring was started. Ethylene was admitted to maintain a pressure of 550 p.s.i. gauge. After 100 minutes, the reactor was opened and all the volatile components were evaporated. A yield of 180.4 g. of polymer was obtained which amounts to a reactivity of 1365 g./g. cat./hr. The melt index of the product was 0.86 and the HLMI/MI ratio was 47.3.

In the tables herein, "prod." means production of polymer per unit weight (gram) of catalyst and "react." means reaction rate expressed as grams of polymer per gram of catalyst per hour.

TABLE I

Homopolymerization of Ethylene at 550 p.s.i. of Total Pressure

| Example No. | Type of silica | $CrO_3$ (percent) | Act. temp. (°C.) | Amt. cat. used (g.) | Ti (percent) | $H_2$ (p.s.i.g.) | Run length (min.) | Rxn. temp. (°C.) | Yield (g.) | Prod. (g./g. cat.) | MI | HLMI/MI |
|---|---|---|---|---|---|---|---|---|---|---|---|---|
| 1 | A | 1 | 790 | .1464 | 5 | 50 | 55 | 109 | 106.3 | 720 | 30.4 | |
| 2 | A | 1 | 790 | .1223 | 5 | 50 | 75 | 108 | 113.8 | 929 | 18.0 | 38.5 |
| 3 | A | 1 | 790 | .0742 | 5 | 0 | 80 | 109 | 60.3 | 814 | 13.0 | 23.9 |
| 4 | A | 1 | 790 | .1141 | 5 | 50 | 130 | 108 | 93.0 | 814 | 24.0 | 37.3 |
| 5 | B | 1 | 800 | .1015 | 0 | 50 | 35 | 109 | 77.0 | 758 | 2.18 | 36.4 |
| 6 | B | 1 | 800 | .0730 | 0 | 0 | 45 | 109 | 70.7 | 968 | 1.29 | 38.4 |
| 7 | C | 1 | 810 | .0851 | 5 | 0 | 95 | 109 | 178.4 | 2,090 | 4.0 | 38.9 |
| 8 | C | 1 | 810 | .0762 | 5 | 50 | 80 | 109 | 87.1 | 1,149 | 9.0 | 42.5 |
| 9 | D | 1 | 800 | .0906 | 5 | 50 | 100 | 108 | 98.5 | 1,095 | 13.5 | 38.7 |
| 10 | E | 2 | 800 | .0418 | 0 | 0 | 52 | 108 | 91.5 | 2,190 | 0.53 | 80.6 |

NOTE.—A = Silica of pore volume 2.2 cc./g. predried at 100° C. for 12 hrs. before titanation; B = Same as A without Ti; C = Silica base of pore volume 1.6 cc./g. dried at 90° C. for 20 hrs. before titanation; D = Same as C but dried only for 5 hrs. at 90° C.; E = Commercial particle form polymerization catalyst without Ti treatment.

TABLE II

Polymerization of Ethylene at 550 p.s.i.g. Silica-$CrO_3$ Catalyst Containing 5% Ti [1]

| Example No. | $CrO_3$ (percent) | Wt. cat. (g.) | Temp. (°C.) | Length of run (min.) | Yield (g.) | Prod. (g./g. cat.) | React. (g./g. cat./hr.) | MI | HLMI/MI |
|---|---|---|---|---|---|---|---|---|---|
| 11 | 2 | .0442 | 108 | 90 | 81.6 | 1,852 | 1,235 | 7.70 | 42.2 |
| 12 | 2 | .0559 | 108 | 100 | 110.6 | 1,975 | 1,185 | 6.14 | 50.8 |
| 13 | 4 | .0744 | 107 | 94 | 25.4 | 342 | 276 | | |

Commercial Catalyst (Davison 969 MS) [2]

| 14 | 2 | .0793 | 108 | 100 | 180.4 | 2,275 | 1,365 | .86 | 47.3 |
| 15 | 2 | .0724 | 109 | 95 | 152.0 | 2,100 | 1,325 | 1.48 | 42.5 |

[1] The silica was predried at 100° C. for about 3 hrs. before titanation. It was further activated at 780° C.
[2] Davison 969 MS was activated at 800° C.

TABLE III

Polymerization Using Titanated Catalysts (550 p.s.i.g.) [1][2]

| Example No. | Catalyst | Ti (percent) | Cat. wt. (g.) | Rxn. temp. (°C.) | Length of run (min.) | Yield (g.) | Prod. (g./g. cat.) | React. (g./g. cat./hr.) | MI | HLMI/MI |
|---|---|---|---|---|---|---|---|---|---|---|
| 16 | Silica, Davison 952-2% $CrO_3$ | 5.0 | .0442 | 108 | 90 | 81.6 | 1,852 | 1,235 | 7.72 | 42.2 |
| 17 | do | 3.5 | .0530 | 105 | 100 | 101.5 | 1,916 | 1,150 | 4.78 | 45.3 |
| 18 | do | 2.5 | .0568 | 108 | 80 | 116.8 | 2,050 | 1,540 | 5.90 | 42.0 |
| 19 | do | 2.0 | .0697 | 108 | 120 | 140.0 | 2,010 | 1,005 | 4.00 | 43.8 |
| 20 | Silica, SMR-7-2964, 2% $CrO_3$ | 2.5 | .0804 | 108 | 60 | 108.8 | 1,355 | 1,355 | 7.90 | 38.1 |
| 21 | do | 2.5 | .0578 | 108 | 85 | 121.3 | 2,100 | 1,485 | 6.76 | 37.5 |

[1] Catalysts were predried at 110° C. for 3 hrs. Activated in air at 800° C. after titanation.
[2] Davison silica 952 has a pore volume of 1.6 cc./g.; Davison silica SMR-7-2964 has a pore volume of 2 cc./g.

TABLE IV

Polymerization of Ethylene With the Silica-2% $CrO_3$ Titanated Catalyst at 550 p.s.i.g.[1]

| Example No. | Ti (percent) | Cat. wt. (g.) | Length of run (min.) | Temp. (°C.) | Yield (g.) | Prod. (g./g. cat.) | React. (g./g. cat./hr.) | MI | HLMI/MI |
|---|---|---|---|---|---|---|---|---|---|
| 22 | 8.0 | .0317 | 60 | 103 | 83.1 | 2,620 | 2,620 | 0.50 | |
| 23 | 8.0 | .0381 | 45 | 103 | 89.3 | 2,340 | 3,120 | | |
| 24 | 5.0 | .0679 | 60 | 103 | 143.5 | 2,105 | 2,105 | 1.42 | 76.6 |
| 25 | 5.0 | .0695 | 60 | 102 | 149.6 | 2,150 | 2,150 | 1.74 | 83.3 |
| 26 | 5.0 | .0825 | 50 | 98 | 214.0 | 2,594 | 3,112 | .33 | |
| 27 | 5.0 | .0837 | 70 | 100 | 196.0 | 2,341 | 2,007 | 1.10 | |
| 28 | 3.5 | .0489 | 95 | 99 | 90.8 | 1,860 | 1,240 | 1.78 | 77.0 |
| 29 | 3.5 | .0691 | 105 | 100 | 126.8 | 1,830 | 1,045 | 2.51 | 72.0 |
| 30 | 3.5 | .0553 | 70 | 99 | 100.6 | 1,820 | 1,680 | 1.82 | 80.0 |
| 31 | 3.5 | .0543 | 80 | 99 | 115.7 | 2,130 | 1,600 | 1.62 | 78.6 |
| 32 | 3.5 | .0673 | 90 | 96 | 126.1 | 1,880 | 1,250 | 1.03 | 100.0 |
| 33 | 3.5 | .0661 | 90 | 97 | 124.5 | 1,880 | 1,250 | 1.78 | 75.0 |
| 34 | 3.5 | .0523 | 90 | 95 | 106.4 | 2,040 | 1,360 | 0.958 | 101.0 |
| 35 | 2.5 | .0538 | 60 | 101 | 137.8 | 2,560 | 2,560 | 1.07 | 75.4 |
| 36 | 2.5 | .0513 | 85 | 100 | 109.0 | 2,130 | 1,595 | .94 | 80.0 |
| 37 | 2.0 | .0542 | 70 | 102 | 114.5 | 2,100 | 1,810 | .82 | 77.1 |
| 38 | 2.0 | .0555 | 60 | 102 | 123.9 | 2,230 | 2,230 | .75 | 8.00 |
| 39 | (2) | .0724 | 95 | 109 | 152.0 | 2,100 | 1,325 | 1.48 | 42.5 |

[1] All catalysts were predried at 100° C. for 3 hrs. before titanation and activated at 800° C. The silica used was Davison chemical grade 952.
[2] Silica 2% $CrO_3$, no Ti.

TABLE V

Polymerization of Ethylene Using Silica-2% $CrO_3$ Containing Boron as a Second Component (550 p.s.i. Total Pressure)

| Example No. | B (percent) | Act. temp. (°C.) | Amt. cat. used (g.) | Run length (min.) | Rxn. temp. (°C.) | Yield (g.) | Prod. (g./g. cat.) | Reactivity (g./g. cat./hr.) | MI | HLMI/MI |
|---|---|---|---|---|---|---|---|---|---|---|
| 40 | 1.8 | 580 | .0625 | 100 | 108 | 104 | 1,660 | 995 | 0.80 | 34.0 |
| 41 | 1.8 | 581 | .0630 | 110 | 109 | 124 | 1,965 | 1,089 | 0.75 | 36.8 |
| 42 | 0 | 800 | .0724 | 95 | 109 | 152 | 2,100 | 1,325 | 1.48 | 42.5 |

TABLE VI

Polymerization of Ethylene Using Silica-2% $CrO_3$ Containing Vanadium as a Second Component (550 p.s.i.)

| Example No. | V (percent) | Act. temp. (°C.) | Amt. cat. used (g.) | Run length (min.) | Rxn. temp. (°C.) | Yield (g.) | Prod. (g./g. cat.) | Reactivity (g./g. cat./hr.) | MI | HLMI/MI |
|---|---|---|---|---|---|---|---|---|---|---|
| 43 | 3.5 | 620 | .0579 | 95 | 105 | 111.6 | 1,925 | 1,218 | .22 | 61.0 |
| 44 | 3.5 | 620 | .0445 | 95 | 108 | 75.5 | 1,695 | 1,065 | .42 | 52.3 |

Treatment of the chromium oxide catalyst so as to produce a mixture of titanium and boron oxides on the catalyst resulted in a polyethylene having the high melt index effect of titanium ester and the narrow molecular weight distribution effect of boron ester. These results are illustrated in the accompanying Table VII.

TABLE VII

Polymerization of Ethylene Using Silica-2% CrO₃ Containing 1.8% B and 2.5% Ti (550 p.s.i.g.)

| Example No. | Act. temp. (° C.) | Cat. wt. (g.) | Length of run (min.) | Rxn. temp. (° C.) | Yield (g.) | Prod. (g./g. cat.) | React. (g./g. cat./hr.) | MI | HLMI/MI |
|---|---|---|---|---|---|---|---|---|---|
| 45 | 810 | .0680 | 80 | 108 | 142.6 | 2,100 | 1,570 | 1.60 | 46.5 |
| 46 | 810 | .0573 | 80 | 108 | 123.5 | 2,160 | 1,630 | 1.53 | 43.4 |

TABLE VIII

Effect of Drying Temperature of Silica Before Titanium Treatment Davison, 952-2% CrO₃, 3.5% Ti Catalyst

| Example No. | Drying temp. (° C.)[1] | Cat. wt. (g.) | Length of run (min.) | Temp. (° F.) | Yield (g.) | Prod. (g./g. cat.) | React. (g./g. cat./hr.) | MI | HLMI/MI |
|---|---|---|---|---|---|---|---|---|---|
| 47 | 40 | .0607 | 85 | 226 | 123.3 | 2,030 | 1,432 | 8.39 | 32.7 |
| 48 | 150 | .0533 | 95 | 226 | 106.0 | 1,970 | 1,255 | 5.64 | 36.0 |

[1] Silica predried for 3 hours.

In a "sweep-in" method of titanium addition, Davison 952-2% CrO₃ was predried at 100° C. for 3 hours. It was treated with titanium tetraisopropyl titanate vapor swept in by a nitrogen stream while the titanium compound was heated to its boiling point. The result is shown below.

TABLE IX

| Example No. | Ti (percent) | Cat. wt. (g.) | Length of run (min.) | Temp. (° F.) | Yield (g.) | Prod. (g./g. cat.) | React. (g./g. cat./hr.) | MI | HLMI/MI |
|---|---|---|---|---|---|---|---|---|---|
| 49 | 3 | .0916 | 120 | 227 | 192 | 2,100 | 1,050 | 5 | 14 |

Davison 969 MS catalyst (silica with 2% CrO₃) was predried at 100° C. for 3 hours and used in place of 952-2% CrO₃. The results are shown below:

TABLE X

| Example No. | Ti (percent) | Cat. wt. (g.) | H₂ (p.s.i.) | Temp. (° F.) | Length of run (min.) | Yield (g.) | Prod. (g./g. cat.) | React. (g./g. cat./hr.) | MI | HLMI/MI |
|---|---|---|---|---|---|---|---|---|---|---|
| 50 | 3.5 | .0459 | 50 | 226 | 85 | 111.2 | 2,420 | 1,715 | 6.8 | 45.4 |
| 51 | 3.5 | .0648 | 0 | 208 | 50 | 151.3 | 2,330 | 2,800 | .11 | 155.7 |
| 52 | 3.5 | .0597 | 0 | 215 | 55 | 129.0 | 2,165 | 2,360 | .27 | 126.0 |
| 53 | 0 | .0448 | 0 | 226 | 55 | 97.2 | 2,170 | 2,370 | .88 | 56.2 |
| 54 | 2.5 | .0708 | 0 | 226 | 70 | 128.0 | 1,810 | 1,550 | 2.25 | 56.0 |
| 55 | 2.5 | .0469 | 0 | 226 | 75 | 101.0 | 2,150 | 1,720 | 2.60 | 51.5 |
| 56 | 7.0 | .0617 | 0 | 226 | 60 | 125.5 | 2,035 | 2,035 | | |
| 57 | 7.0 | .0555 | 0 | 227 | 90 | 104.9 | 1,905 | 1,274 | 4.97 | 46.3 |

In the hexene modification of titanium catalyst, 969 MS 5% titanium catalyst was used in hexene copolymerizations of ethylene. Hexene increases the MI and shear response of the copolymer. The results are shown below:

TABLE XI

| Example No. | Cat. | Cat. wt. (g.) | Temp. (° F.) | Length of run (min.) | Yield (g.) | Prod. (g./g. cat.) | React. (g./g. cat./hr.) | MI | HLMI/MI |
|---|---|---|---|---|---|---|---|---|---|
| 58 | Silica-2% CrO₃, 5% Ti | .0523 | 221 | 60 | 109.0 | 2,090 | 2,090 | 1.9 | 64.5 |
| 59[1] | do | .0573 | 218.5 | 110 | 114.6 | 2,001 | 1,090 | 9.67 | 34.9 |
| 60[1] | do | .0637 | 203 | 60 | 163.7 | 2,670 | 2,670 | .21 | 78.6 |

[1] 15 cc. of hexene was added.

Tetrabutyl and tetraethylhexyl titanate were used in place of tetraisopropyl titanate for titanation of 952-2% CrO₃ catalyst. The effect of these esters was somewhat smaller than that of tetraisopropyl titanate, as shown on the following table.

In the catalyst of this invention the carrier is the major component. The chromium oxide present has a chromium content of about 0.5–10 weight percent of the catalyst, the oxygenated titanium has a titanium content of about 0.5–10 weight percent of the catalyst and the boron, vanadium or both where used each has a similar 0.5–10 weight percent content of the catalyst. These are expressed on the basis of the metal present. The polymerization temperatures, pressures, times and other conditions are as discussed above in the background of the invention.

All percentages herein are by weight.

Having described our invention as related to the embodiments set out herein, it is our intention that the invention be not limited by any of the details of description, unless otherwise specified, but rather be construed broadly within its spirit and scope as set out in the appended claims.

We claim:
1. A catalyst prepared by first forming a substantially dry intimate mixture of a support of the class consisting of silica, alumina, zirconia, thoria and mixtures thereof and chromium oxide on said support to form a substan-

TABLE XII

| Example No.[1] | Ti (percent) | Ester | Cat. wt. (g.) | Length of run (min.) | Temp. (° F.) | Yield (g.) | Prod. (g./g. cat.) | React. (g./g. cat./hr.) | MI | HLMI/MI |
|---|---|---|---|---|---|---|---|---|---|---|
| 61 | 3.5 | Butyl | .0486 | 75 | 226 | 102.8 | 2,110 | 1,690 | 1.60 | 54.0 |
| 62 | 3.5 | do | .0384 | 70 | 226 | 126.6 | 2,170 | 1,860 | 1.78 | 54.2 |
| 63 | 3.5 | Ethyl hexyl | .0501 | 65 | 226 | 106.7 | 2,130 | 1,963 | 1.15 | 62.2 |

[1] All catalysts were predried at 100° C. for 3 hours before titanation.

tially dry bed containing about 0.5–10 weight percent chromium including at least about 0.1 weight percent hexavalent chromium, followed by fluidizing said bed with a substantially dry gas, and then adding to said bed at an elevated temperature while fluidizing an alkyl ester of a member of the class consisting of the metals titanium, boron, vanadium and combinations thereof containing 1–7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5–10 weight percent of said metal in the final catalyst.

2. The catalyst of claim 1 wherein said bed is dried before the adding of the ester by fluidizing the bed at an elevated drying temperature.

3. The catalyst of claim 2 wherein said ester is added to the fluidized bed at the drying temperature and said activating of the bed is at a temperature above the drying temperature.

4. The catalyst of claim 1 wherein said ester is added to said fluidized bed so as to give about 3.5 weight percent of said metal in said catalyst.

5. The catalyst of claim 1 wherein said elevated temperature is approximately 100° C.

6. A catalyst prepared by first forming a substantially dry intimate mixture of a support of the class consisting of silica, alumina, zirconia, thoria and mixtures thereof and chromium oxide on said support to form a substantially dry bed containing about 0.5–10 weight percent chromium including at least about 0.1 weight percent hexavalent chromium, followed by fluidizing said bed with a substantially dry gas, and then adding to said bed at an elevated temperature while fluidizing an alkyl ester of titanium containing 1–7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5–10 weight percent of said titanium in the final catalyst.

7. A catalyst prepared by first forming a substantially dry intimate mixture of a support of the class consisting of silica, alumina, zirconia, thoria and mixtures thereof and chromium oxide on said support to form a substantially dry bed containing about 0.5–10 weight percent chromium including at least about 0.1 weight percent hexavalent chromium, followed by fluidizing said bed with a substantially dry gas, and then adding to said bed at an elevated temperature while fluidizing an alkyl ester of boron containing 1–7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5–10 weight percent of said boron in the final catalyst.

8. A catalyst prepared by first forming a substantially dry intimate mixture of a support of the class consisting of silica, alumina, zirconia, thoria and mixtures thereof and chromium oxide on said support to form a substantially dry bed containing about 0.5–10 weight percent chromium including at least about 0.1 weight percent hexavalent chromium, followed by fluidizing said bed with a substantially dry gas, and then adding to said bed at an elevated temperature while fluidizing an alkyl ester of titanium and an alkyl ester of boron each containing 1–7 carbon atoms in the alkyl group, said esters being substantially free of non-aqueous solvents and said gas being substantially inert to said bed and said esters, and activating said bed with a dry gas that contains oxygen, said esters having been added in an amount to give about 0.5–10 weight percent of said titanium and boron in the final catalyst.

9. The method of making polymers of controllable viscoelastic responses, narrow to broad molecular weight distribution, particularly suitable in blow molding, injection molding, thermoforming, film extrusion, and the like, from polymerizable 1-olefins which comprises polymerizing at least one of said olefins under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5–10 weight percent chromium including at least about 0.1 weight percent hexavalent chromium, followed by fluidizing said bed with a substantially dry gas, and then adding to said bed at an elevated temperature while fluidizing an alkyl ester of a member of the class consisting of the metals titanium, boron, vanadium and combinations thereof containing 1–7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5–10 weight percent of said metal in the final catalyst and recovering a polymer.

10. The method of making polyethylene of controllable viscoelastic responses, narrow to broad molecular weight distribution, particularly suitable in blow molding, injection molding, thermoforming, film extrusion, and the like which comprises polymerizing ethylene under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5–10 weight percent chromium including at least about 0.1 weight percent hexavalent chromium, followed by fluidizing said bed with a substantially dry gas, and then adding to said bed at an elevated temperature while fluidizing an alkyl ester of a member of the class consisting of the metals titanium, boron, vanadium and combinations thereof containing 1–7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5–10 weight percent of said metal in the final catalyst and recovering polyethylene.

11. The method of making polymers of controllable viscoelastic responses, narrow to broad molecular weight distribution, particularly suitable in blow molding, injection molding, thermoforming, film extrusion and the like, from polymerizable 1-olefins which comprises polymerizing at least one of said olefins under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5–10 weight percent chromium including at least about 0.1 weight percent hexavalent chromium, followed by fluidizing said bed with a substantially dry gas, and then adding to said bed at an elevated temperature while fluidizing an alkyl ester of titanium containing 1–7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5–10 weight percent of said titanium in the final catalyst and recovering a polymer.

12. The method of making polymers of controllable viscoelastic responses, narrow to broad molecular weight distribution, particularly suitable in blow molding, injection molding, thermoforming, film extrusion, and the like, from polymerizable 1-olefins which comprises polymerizing at least one of said olefins under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5-10 weight percent chromium including at least about 0.1 weight percent hexavalent chromium, followed by fluidizing said bed with a substantially dry gas, and then adding to said bed at an elevated temperature while fluidizing an alkyl ester of boron containing 1-7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5-10 weight percent of said boron in the final catalyst and recovering a polymer.

13. The method of making polymers of controllable viscoelastic responses, narrow to broad molecular weight distribution, particularly suitable in blow molding, injection molding, thermoforming, film extrusion, and the like, from polymerizable 1-olefins which comprises polymerizing at least one of said olefins under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5-10 weight percent chromium including at least about 0.1 weight percent hexavalent chromium, followed by fluidizing said bed with a substantially dry gas, and then adding to said bed at an elevated temperature while fluidizing an alkyl ester of titanium and an alkyl ester of boron each containing 1-7 carbon atoms in the alkyl group, said esters being substantially free of non-aqueous solvents and said gas being substantially inert to said bed and said esters, and activating said bed with a dry gas that contains oxygen, said esters having been added in an amount to give about 0.5-10 weight percent of said titanium and boron in the final catalyst and recovering a polymer.

14. The method of making polyethylene of controllable viscoelastic responses, narrow to broad molecular weight distribution, particularly suitable in blow molding, injection molding, thermoforming, film extrusion, and the like which comprises polymerizing ethylene under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5-10 weight percent chromium including at least about 0.1 weight percent hexavalent chromium, followed by fluidizing said bed with a substantially dry gas, and then adding to said bed at an elevated temperature while fluidizing an alkyl ester of titanium containing 1-7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5-10 weight percent of said titanium in the final catalyst and recovering polyethylene.

15. The method of making polyethylene of controllable viscoelastic responses, narrow to broad molecular weight distribution, particularly suitable in blow molding, injection molding, thermoforming, film extrusion, and the like which comprises polymerizing ethylene under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5-10 weight percent chromium including at least about 0.1 weight percent hexavalent chromium, followed by fluidizing said bed with a substantially dry gas, and then adding to said bed at an elevated temperature while fluidizing an alkyl ester of boron containing 1-7 carbon atoms in the alkyl group, said ester being substantially free of non-aqueous solvents and said gas being substantially inert to said bed and said ester, and activating said bed with a dry gas that contains oxygen, said ester having been added in an amount to give about 0.5-10 weight percent of said boron in the final catalyst and recovering polyethylene.

16. The method of making polyethylene of controllable viscoelastic responses, narrow to broad molecular weight distribution, particularly suitable in blow molding, injection molding, thermoforming, film extrusion, and the like which comprises polymerizing ethylene under polymerizing conditions with a catalyst prepared by first forming a substantially dry intimate mixture of a support of the class consisting of silica, alumina, zirconia, thoria and mixtures thereof and chromium oxide on said support to form a substantially dry bed containing about 0.5-10 weight percent chromium including at least about 0.1 weight percent hexavalent chromium, followed by fluidizing said bed with a substantially dry gas, and then adding to said bed at an elevated temperature while fluidizing an alkyl ester of titanium and an alkyl ester of boron each containing 1-7 carbon atoms in the alkyl group, said esters being substantially free of non-aqueous solvents and said gas being substantially inert to said bed and said esters, and activating said bed with a dry gas that contains oxygen, said esters having been added in an amount to give about 0.5-10 weight percent of said titanium and boron in the final catalyst and recovering polyethylene.

17. The catalyst of claim 1 wherein said member comprises vanadium.

18. The catalyst of claim 1 wherein said member comprises titanium and vanadium.

19. The catalyst of claim 1 wherein said member comprises titanium, boron and vanadium.

20. The method of claim 9 wherein said olefin comprises propylene.

21. The method of claim 9 wherein said member comprises vanadium.

22. The method of claim 9 wherein said member comprises titanium and vanadium.

23. The method of claim 9 wherein said member comprises titanium, boron and vanadium.

References Cited

UNITED STATES PATENTS

| | | | |
|---|---|---|---|
| 3,485,771 | 12/1969 | Horvath | 260—94.9 D |
| 3,484,428 | 12/1969 | Kallenbach | 260—94.9 D |
| 3,239,498 | 3/1966 | Witt | 260—94.9 D |
| 3,349,067 | 10/1967 | Hill | 260—94.9 D |
| 2,898,326 | 8/1959 | Peters et al. | 252—430 |
| 3,622,521 | 11/1971 | Hogan et al. | 260—94.9 D |
| 3,625,864 | 12/1971 | Horvath | 260—94.9 D |
| 3,635,840 | 1/1972 | Hinton | 260—94.9 D |

JOSEPH L. SCHOFER, Primary Examiner

A. HOLLER, Assistant Examiner

U.S. Cl. X.R.

252—430, 456, 458, 469; 260—82.1, 85.3 R, 93.7, 94.2 R, 94.3